| United States Patent [19] | [11] | 4,163,609 |
|---|---|---|
| Neefe | [45] | Aug. 7, 1979 |

[54] SELF CLEANING CONTACT LENS

[76] Inventor: Charles W. Neefe, 811 Swing St., Big Spring, Tex. 79720

[21] Appl. No.: 950,211

[22] Filed: Oct. 10, 1978

[51] Int. Cl.² ............................................. G02C 7/04
[52] U.S. Cl. ........................... 351/160 H; 351/160 R
[58] Field of Search ..................... 351/160 R, 160 H; 526/287, 289

[56] References Cited

U.S. PATENT DOCUMENTS

| 3,963,662 | 6/1976 | Fujiwara et al. | 351/160 X |
| 4,097,657 | 6/1978 | Sieglaff et al. | 351/160 X |

*Primary Examiner*—John K. Corbin
*Assistant Examiner*—Scott J. Sugarman

[57] ABSTRACT

A contact lens material, the surface of which is self cleaning of organic debris, by changing the surface charge from a natural anionic positive charge which attract debris to a cationic negative charge which repels debris..

5 Claims, No Drawings

SELF CLEANING CONTACT LENS

THE PRIOR ART

The cleaning and wetting of contact lenses has required special solutions toward which several companies have devoted their resources for many years. The conventional hard contact lens made from polymethylmethacrylate requires a liquid wetting agent to overcome the highly hydrophobic surface of the polymethylmethacrylate.

STATE OF THE ART

Additives to the plastic material have been used (U.S. Pat. Nos. 3,984,485 and 4,110,264), which lower the contact angle and provided for better surface wetting of the lenses. Many liquid cleaners have been developed which remove protein, lipid, and mineral buildup from both hard and soft contact lenses. Eventually soft contact lenses will become impregnated with sufficient foreign material to render the lenses useless and replacement is required. If the tear fluid is allowed to dry upon the surface of a hard contact lens, deposits may occur which are impossible to remove without repolishing the lens surface. No contact lens materials have been previously developed which eliminates the accumulation of these debris on the lens surface.

Procedures have been developed for making polymers having sulfonate groups exposed at the surface. In general these procedures involve forming a sulfonate containing copolymers then adding a chemical agent that creates crosslinks among the long-chain molecules.

When the sulfonate lenses were tested with conditions that usually cause severe buildup of debris, the results proved to be remarkable.

Polymers incorporating in their structure the sulfonate group, gives them an extreme affinity for water and thereby prevents most foreign matter from adhering. Most debris particles are hydrophobic, or in other words, repel water; most of them also bear a negative electric charge. The most serious debris problems are caused by materials such as oily particles and proteins, which have large surface areas that are hydrophobic, or in other words, repel water. When a hydrophobic substance is in an aqueous environment, it can reduce its total energy by reducing the area exposed to the water; two hydrophobic particles, tend to clump together expelling the water from the space between them and thereby reducing their exposed surface. This phenomena is called hydrophobic bonding. In the same way such a particle can be held to the surface of a contact lens by the elimination of repulsive interactions with the surrounding water. Most of the debris materials also bear a negative electric charge, and hydrogen bonding involving these charges also contribute to the buildup of debris. In this kind of bonding the slight positive charge of a hydrogen atom at the surface of the lens attracts a negatively charged group in the debris particle.

One obvious way to avoid hydrophobic interactions is to create a surface that is hydrophilic, one that has a very strong affinity for water. Such a material remains wetted even in the presence of hydrophobic particles, so that the particles cannot adhere to the surface by excluding water.

The most hydrophilic known polymers are those bearing on their surface the sulfonate group, $SO_3^-$. Like the sulfuric acid from which they are derived, sulfonate polymers have a strong affinity for water. Each sulfonate group is surrounded by many water molecules, which cannot be displaced by hydrophobic particles. The sulfonate group is also incapable of hydrogen bonding; indeed, its negative charge repels the negatively charged debris particles. The negative charge of the sulfonate is also maintained even in the presence of a large concentration of hydrogen ions. Moreover, the sulfonate group resists deactiviation by positive ions, such as those of the heavy metals.

In addition to providing resistance to debris, the fixed charges of the sulfonate groups confer another property on lenses: the enhanced rejection of salts. Uncharged surfaces, have only limited ability to exclude salts, which exist in solution as negative and positive ions. In the sulfonate lenses, however, the fixed negative charges generate an electric field that repels ions of the same charge and thereby excludes them from the lens surface. Since the electrical neutrality of the solution must be maintained positive ions are also blocked.

In liquid water about half the molecules at any moment are in clusters that have the same orderly structure as a crystal of ice. In the clusters each water molecule is placed so that the oxygen atom occupies the vertex of a tetrahedron and so that a hydrogen bond connects each pair of water molecules. In ice, this stable structure extends over a long distance, but in the liquid state the icelike clusters generally include only a few molecules each, and they are constantly forming and disintegrating. Inside the structure of a negative charged hydrophilic soft lens the water assumes an icelike state, in which the molecules have an orderly arrangement and are held together by hydrogen bonds. The geometry of the icelike state is tetrahedral, with each oxygen atom surrounded by four others at equal distances. Other molecules and particles are rejected, including not only those that are too large to fit through the lens membrane but also small molecules that cannot conform to the icelike structure. Ions in particular are excluded because they are shielded by a layer of water that would disrupt the icelike lattice.

Sulfur and phosphorous containing polymers have been found to exhibit the highest degree of hydrophilicity with the sulfonates being the most hydrophilic. The monomers may be selected from the following or other similar monomers.

1. Allyl Disulfide
2. Allylethylsulfide
3. Allyl Methyl Sulfide
4. Allylphenyl Sulfide
5. Allyl n-Propyl Sulfide
6. Allyl iso-Propyl Sulfide
7. Diallyl Phosphite
8. Diallyl Disulfide
9. Diallyl Sulfide
10. Divinyl Sulfone
11. Ethylene Sulfide
12. Sodium Allyl Sulfonate
13. Sodium p-Styrene Sulfonate
14. Vinyl Sulfonate, Sodium Salt
15. Vinyl Sulfonic Acid
16. Styrene Sulfonic Acid
17. Diallylallyl Phosphonate
18. Diallyl Phosphite
19. beta-Styrene Sulfonate
20. Triallyl Phosphate
21. Vinyl Methyl Sulfide
22. Vinyl Triphenylphosphonium Bromide 23. Vinyl Ethyl Sulfone
24. Sodium Styrene Sulfonate Copolymers are formed by polymerizing the above sulfur and phosphorous monomer with one or more of the following monomer examples.

1. Methylmethacrylate
2. Styrene
3. Cyclohexyl Methacrylate
4. Acrylonitrile
5. Ethylene Glycol Monomethacrylate
6. Methacrylonitrile
7. Hydroxypropyl Methacrylate Crosslikers may be selected from one or more of the following examples.

1. Diglycol Carbonate
2. Allyl Methacrylate
3. Tetraethylene Glycol Dimethacrylate
4. Ethylene Dimethacrylate
5. Divinyl Benzene
6. Vinyl Crotonate

DESCRIPTION OF THE PREFERRED EMBODIMENTS 100 parts by weight methylmethacrylate monomer are mixed with 40 parts by weight Styrene Sulfonic Acid monomer and 5 parts by weight Ethylene Dimethacrylate crosslinker. The catalyst 2,2' Azobis 2 Methyl Propionitrile is added in the amount of 0.25 percent by weight to the total volume of liquid monomers. The monomers are purged of oxygen and placed under a nitrogen blanket. A water bath at 55° C. is used for twelve hours to polymerize the mixture to a solid. The solid is removed from the water bath and placed in a 70° C. oven for twenty four hours to complete the polymerization and relieve internal stress within the material. The material is removed from the container which held it during polymerization and cut into discs one half inch in diameter and 0.25 inch in thickness. A contact lens concave-convex form in section is fabricated from the disc by methods well known to the art. The contact lens will wet well when in the eye and exposed to the tears present in the eye and will remain free of the protein and oily debris commonly found in the natural tear fluid and on the surface of contaminated conventional contact lenses.

Various modifications can be made without departing from the spirit of this invention or the scope of the appended claims. The constants set forth in the disclosure are given as examples and are in no way final or binding. In view of the above, it will be seen that the several objects of the invention are achieved and other advantages are obtained. As many changes could be made in the above construction and methods without departing from the scope of the invention, it is intended that all matter contained in the above description shall be interpreted as illustrative and not in a limiting sense.

That which is claimed is:

1. A contact lens of concave-convex form in section, composed of a polymeric material having a negative electrical charge present on a hydrophilic surface and the lens surface having an affinity for water, whereby the lens material, while in the eye remains wetted by the liquid tears present on the surface of the eye and the hydrophilic surface of the lens material resists the accumulation of and repels from the lens surface the natural hydrophobic oil and protein particles present in the natural tear fluid present on the surface of the eye.

2. A contact lens as in claim 1 wherein the polymeric lens material contains a sulfonate group on the surface.

3. A contact lens as in claim 1 wherein the hydrophilic lens surface resist the hydrophobic bonding of the hydrophobic oil and protein present in the natural tears.

4. A contact lens as in claim 1 wherein the contact lens is a hydrophilic soft contact lens.

5. A contact lens as in claim 1 wherein the contact lens is a hard contact lens.

* * * * *